United States Patent
Mitani et al.

(10) Patent No.: US 9,310,775 B2
(45) Date of Patent: Apr. 12, 2016

(54) ANALOG ELECTRONIC TIMEPIECE

(71) Applicant: Seiko Instruments Inc., Chiba-shi, Chiba (JP)

(72) Inventors: Makoto Mitani, Chiba (JP); Kotaro Watanabe, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/797,416

(22) Filed: Jul. 13, 2015

(65) Prior Publication Data

US 2016/0018788 A1  Jan. 21, 2016

(30) Foreign Application Priority Data

Jul. 16, 2014  (JP) .................................. 2014-146286

(51) Int. Cl.
| | |
|---|---|
| *G04C 10/00* | (2006.01) |
| *G04G 19/06* | (2006.01) |
| *H02M 3/156* | (2006.01) |
| *G04F 5/04* | (2006.01) |

(52) U.S. Cl.
CPC ........ *G04F 5/04* (2013.01); *G04C 10/00* (2013.01); *G04G 19/06* (2013.01); *H02M 3/1563* (2013.01)

(58) Field of Classification Search
CPC .......... G04F 5/04; G04C 10/00; G04G 19/02; G04G 19/06; H02M 3/1563
See application file for complete search history.

(56) References Cited

U.S. PATENT DOCUMENTS

| | | | | | |
|---|---|---|---|---|---|
| 4,298,971 | A * | 11/1981 | Morokawa | ............. | G04C 10/04 331/143 |
| 4,395,138 | A * | 7/1983 | Chihara | ................. | G04C 10/00 368/204 |
| 4,428,040 | A * | 1/1984 | Yamashiro | ............. | G04G 19/00 363/62 |
| 4,441,826 | A * | 4/1984 | Morokawa | ............. | G04C 10/04 323/281 |
| 4,498,040 | A * | 2/1985 | Tatsushi | ........... | G01R 19/16571 257/E27.06 |
| 6,463,010 | B1 * | 10/2002 | Nakamiya | ............. | G04C 10/00 368/204 |
| 2013/0250741 | A1 * | 9/2013 | Mitani | ................... | G04G 19/04 368/160 |

FOREIGN PATENT DOCUMENTS

JP  2000-298523 A  10/2000

* cited by examiner

*Primary Examiner* — Vit W Miska
(74) *Attorney, Agent, or Firm* — Brinks Gilson & Lione

(57) ABSTRACT

To provide an analog electronic timepiece which prevents a crystal oscillation circuit from malfunctioning even if a battery voltage is lowered at motor loading. An analog electronic timepiece is equipped with a crystal vibrator, an oscillation circuit, a frequency division circuit, a constant voltage circuit, an output control circuit, and a motor. The analog electronic timepiece is configured in such a manner that the constant voltage circuit has a voltage holding circuit connected between a gate of an output transistor and a power supply terminal, and the oscillation circuit and the frequency division circuit are operated with a constant voltage generated by the constant voltage circuit as a power supply.

4 Claims, 4 Drawing Sheets

ANALOG ELECTRONIC TIMEPIECE

RELATED APPLICATIONS

This application claims priority under 35 U.S.C. §119 to Japanese Patent Application No. 2014-146286 filed on Jul. 16, 2014, the entire content of which is hereby incorporated by reference.

BACKGROUND OF THE INVENTION

1. Field of the Invention

The present invention relates to an analog electronic timepiece, and particularly to a stable operation of an oscillation circuit at the time of driving a motor.

2. Background Art

FIG. 5 is a general block diagram of an analog electronic timepiece using a crystal oscillation circuit used in a wrist watch or the like.

The analog electronic timepiece is comprised of a semiconductor device 70, a battery 71, a crystal vibrator 72, and a motor 73. The semiconductor device 70 is comprised of an oscillation circuit 702 which enables oscillation at a stable frequency by a combination with the external crystal vibrator 72, a frequency division circuit 703 which divides a reference clock signal OSC obtained from the oscillation circuit 702 into clock signals each having a desired frequency, a constant voltage circuit 701 which drives the oscillation circuit 702 and the frequency division circuit 703, and an output control circuit 704 which drives the motor 73.

A circuit example of the related art constant voltage circuit 701 is illustrated in FIG. 6. The constant voltage circuit 701 is equipped with a reference voltage circuit 22 which generates a reference voltage Vref, a differential amplifier circuit 23, an output transistor 10, a feedback circuit 21, a voltage holding circuit 40 comprised of a capacitor, and a switch circuit 50.

The constant voltage circuit 701 has the voltage holding circuit 40 which holds a gate voltage V1 of the output transistor 10 and reduces power consumption by allowing the differential amplifier circuit 23 or the like to be intermittently operated. The differential amplifier circuit 23 and the feedback circuit 21 are stopped from operating by a signal Φ1 to turn off the switch circuit 50. At this time, the voltage holding circuit 40 holds a voltage prior to turning off of the switch circuit 50 as the gate voltage V1 of the output transistor 10. The constant voltage circuit 701 is capable of outputting a constant voltage VREG unless a load current fluctuates greatly (refer to, for example, Patent Document 1).

A block diagram of the related art oscillation circuit 702 is illustrated in FIG. 7. The oscillation circuit 702 is equipped with an oscillation inverter comprised of a PMOS transistor P01 and an NMOS transistor N01, a feedback resistor RF configured by connecting a PMOS transistor P02 and an NMOS transistor N02 in parallel, oscillation capacitors CG and CD, a coupling capacitor CC, a switch element SW comprised of a transmission gate configured of a PMOS transistor P03 and an NMOS transistor N03, a dumping resistor RD comprised of an NMOS transistor NR1 doped with a high concentration impurity under a gate thereof, and a waveform shaping circuit 100. Further, an ESD protection element ESD1 comprised of an NMOS transistor N04 and an ESD protection element ESD2 comprised of an NMOS transistor N05 are respectively provided at terminals XIN and XOUT to which the crystal vibrator 72 is connected. The NMOS transistors N02, N03, N04, N05, and NR1 are provided relative to a substrate connected to a negative electrode terminal VSS of the battery 71.

Now consider where in the analog electronic timepiece, the output control circuit 704 outputs a motor pulse output to rotate the motor 73. Since the battery 71 and the motor 73 have resistive components, a battery voltage VSS is lowered by a voltage determined by the product of the load current of the motor 73 and the internal resistance of the battery 71. With this voltage drop, a transient voltage drop occurs even in the output voltage VREG of the constant voltage circuit 701. In order to reduce current consumption of each of the oscillation circuit 702 and the frequency division circuit 703, the output voltage VREG is set to be as close to an oscillation stop voltage VDOS of the oscillation circuit 702 as possible. When the output voltage VREG falls below the oscillation stop voltage VDOS due to the voltage drop, the oscillation becomes unstable and in the worst case, the oscillation stops.

[Patent Document 1] Japanese Patent Application Laid-Open No. 2000-298523

SUMMARY OF THE INVENTION

The related art constant voltage circuit is however accompanied by a structural defect that since the transient response characteristics of the differential amplifier circuit 23 is poor when the motor of the analog electronic timepiece is driven and thereby the battery voltage drops suddenly, the gate-source voltage of the output transistor 10 is reduced so that the constant voltage VREG is also varied.

Further, the related art oscillation circuit is not capable of continuing stable oscillation with respect to a fluctuation in the battery voltage VSS itself. Specifically, since the potential of the substrate is at VSS in terms of each of the NMOS transistors N02, N03, N04, N05, and NR1, the fluctuation in VSS is transferred to its drain (or source) as noise through a parasitic capacitance between a PWELL which serves as the substrate and an N+ diffusion region which serves as the drain (or source). Since the drains (or sources) of the NMOS transistors N02, N03, N04, N05, and NR1 are connected to nodes (XIN, XIN1, XOUT, and XOUT2) important in continuing oscillating operations, the oscillation becomes unstable when they receive the noise.

The present invention has been made in view of the above problems and provides an analog electronic timepiece which continues stable oscillation even if a battery voltage varies.

In order to solve the related art problems, the analog electronic timepiece of the present invention is configured as follows:

The analog electronic timepiece is equipped with a crystal vibrator, an oscillation circuit, a frequency division circuit, a constant voltage circuit, an output control circuit, and a motor. The oscillation circuit and the frequency division circuit are operated with a constant voltage generated by the constant voltage circuit as a power supply. The constant voltage circuit is equipped with an output transistor connected between an output terminal and a power supply terminal, a voltage division circuit which is connected between the output terminal and a ground terminal and divides an output voltage of the output terminal to output a feedback voltage, a reference voltage circuit which outputs a reference voltage, a differential amplifier circuit which controls a voltage of a gate of the output transistor, based on the reference voltage and the feedback voltage, and a first voltage holding circuit connected between the gate of the output transistor and the power supply terminal.

According to the analog electronic timepiece of the present invention, the analog electronic timepiece is capable of obtaining stable oscillation even in a state of a motor load at

DETAILED DESCRIPTION OF THE PREFERRED EMBODIMENTS

An analog electronic timepiece according to the present embodiment will hereinafter be described with reference to the accompanying drawings.

Figure 5:
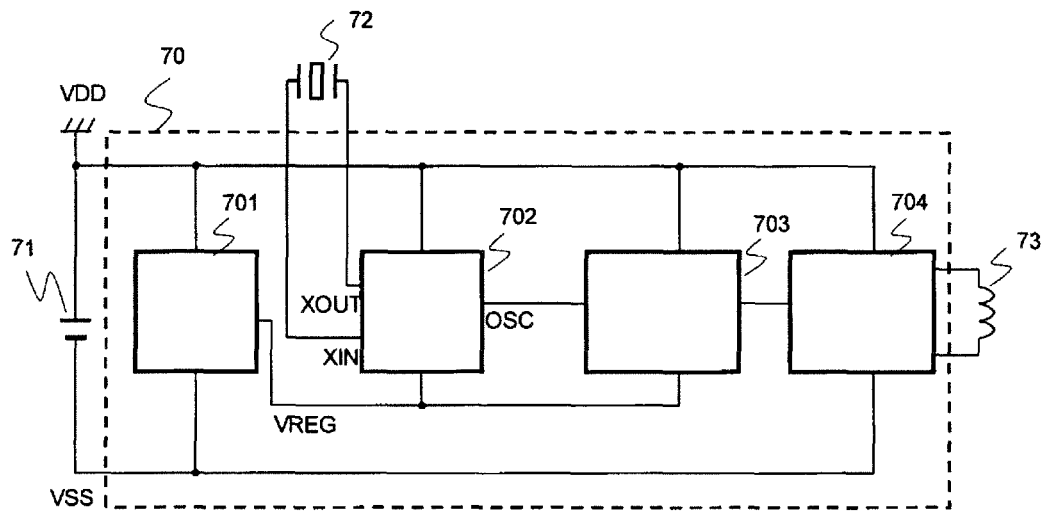
FIG. 5 is a block diagram of an analog electronic timepiece.
Figure 6:
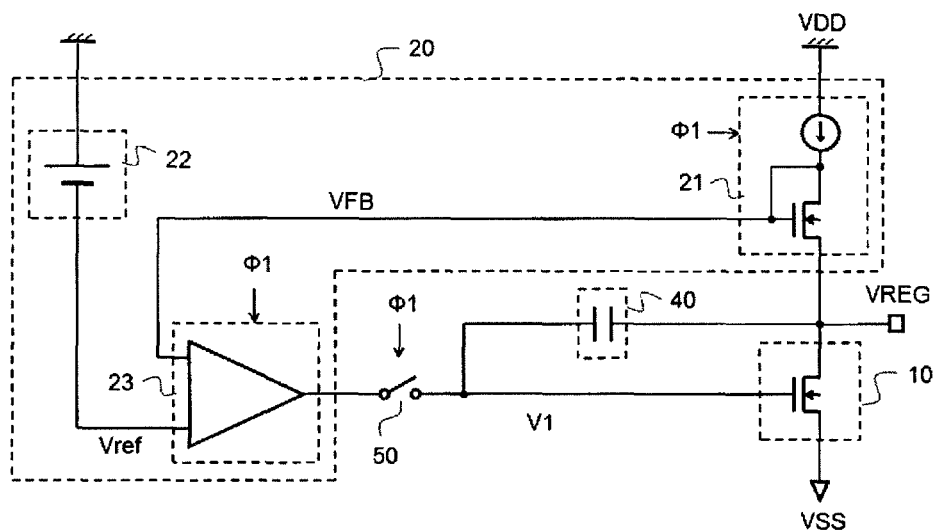
FIG. 6 is a block diagram of a related art constant voltage circuit.
Figure 7:
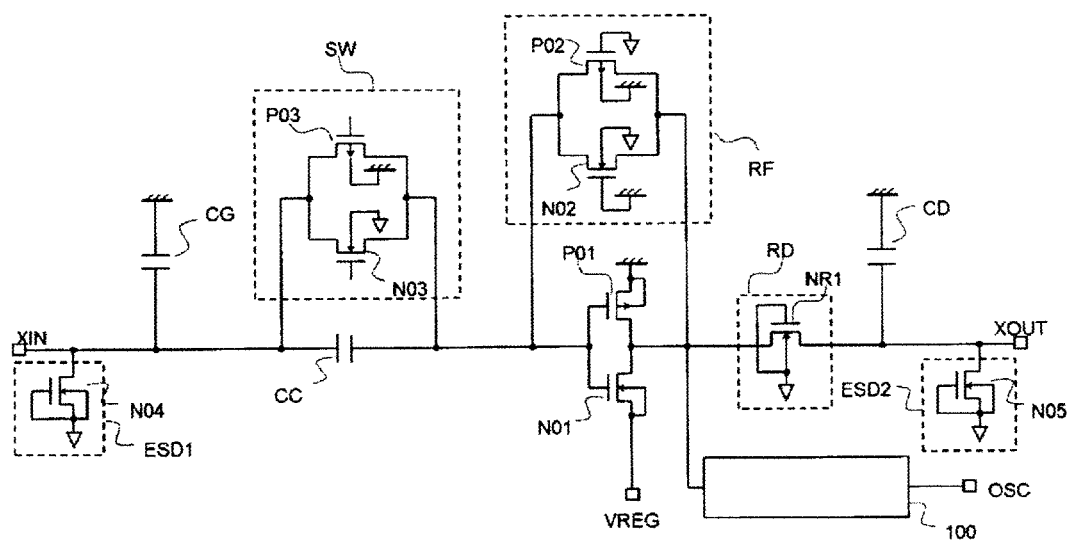
FIG. 7 is a block diagram of a related art oscillation circuit.

FIG. 5 is a general block diagram of an analog electronic timepiece using a crystal oscillation circuit used in a wrist watch or the like.

The analog electronic timepiece is comprised of a semiconductor device 70, a battery 71, a crystal vibrator 72, and a motor 73. The semiconductor device 70 is comprised of an oscillation circuit 702 which enables oscillation at a frequency stable by a combination with the external crystal vibrator 72, a frequency division circuit 703 which divides a reference clock signal OSC obtained from the oscillation circuit 702 into clock signals each having a desired frequency, a constant voltage circuit 701 which drives the oscillation circuit 702 and the frequency division circuit 703, and an output control circuit 704 which drives the motor 73.

Figure 1:
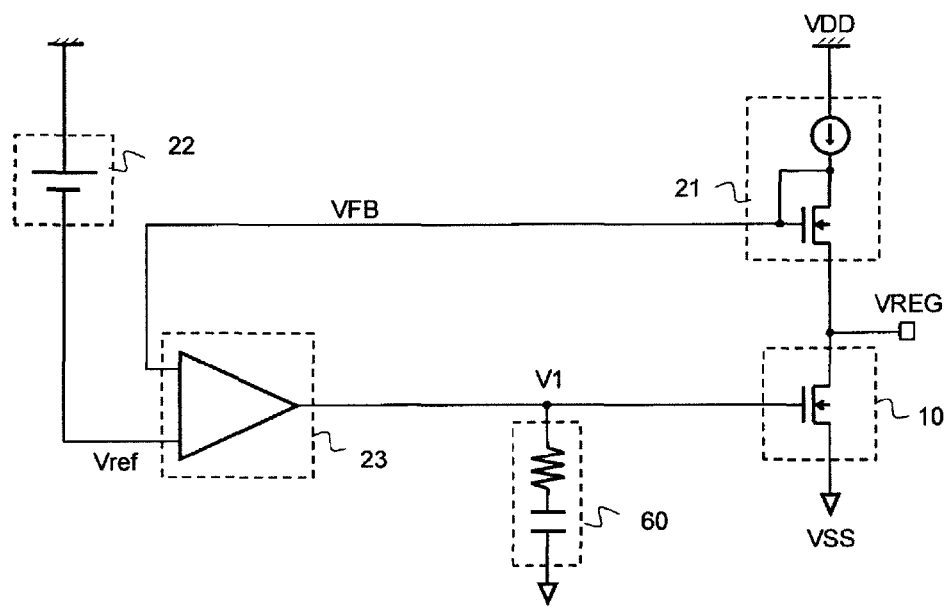
FIG. 1 is a block diagram of a constant voltage circuit of the present embodiment.

FIG. 1 is a block diagram illustrating a constant voltage circuit of the present embodiment. The constant voltage circuit is equipped with a reference voltage circuit 22, a differential amplifier circuit 23, an output transistor 10, a feedback circuit 21, and a voltage holding circuit 60.

The reference voltage circuit 22 generates a reference voltage Vref. The feedback circuit 21 divides a voltage VREG at an output terminal to output a feedback voltage VFB. The differential amplifier circuit 23 outputs a voltage V1 to a gate of the output transistor 10 in such a manner that the reference voltage Vref and the feedback voltage VFB become equal to each other. The voltage holding circuit 60 is comprised of, for example, a resistor and a capacitor connected in series and is connected between the gate of the output transistor 10 and a power supply terminal VSS.

Here, when a power supply voltage VSS is varied to the ground voltage VDD side by driving the motor 73, for example, the constant voltage circuit 701 is operated as follows:

When the power supply voltage VSS is varied to the ground voltage VDD side, the gate voltage V1 of the output transistor 10 is affected by its variation through the voltage holding circuit 60 and varied to the ground voltage VDD side. Thus, since the output transistor 10 is kept constant in gate-source voltage, a drain current thereof becomes constant. As a result, the constant voltage circuit 701 is capable of outputting a constant fixed voltage VREG without being affected by the variation in the power supply voltage VSS.

Figure 2:
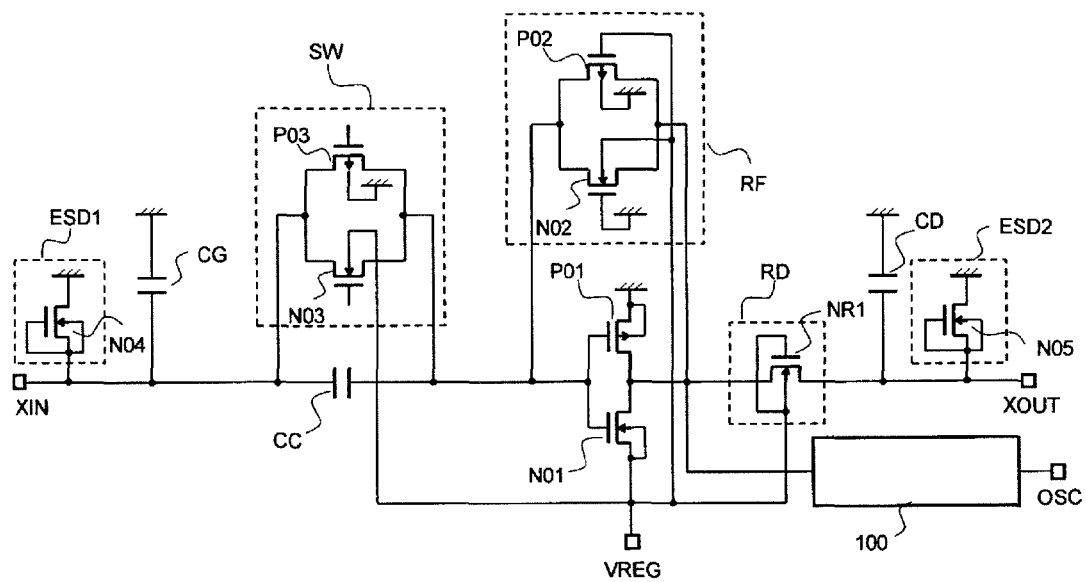
FIG. 2 is a block diagram of an oscillation circuit of the present embodiment.

FIG. 2 is a block diagram illustrating an oscillation circuit of the present embodiment.

The oscillation circuit 702 is equipped with an oscillation inverter comprised of a PMOS transistor P01 and an NMOS transistor N01, a feedback resistor RF configured by a parallel connection of a PMOS transistor P02 and an NMOS transistor N02, oscillation capacitors CG and CD, a coupling capacitor CC, a switch element SW configured by a transmission gate consisting of a PMOS transistor P03 and an NMOS transistor N03, a damping resistor RD comprised of an NMOS transistor NR1 doped with a high concentration impurity under its gate, and a waveform shaping circuit 100. Further, the oscillation circuit 702 is equipped with terminals XIN and XOUT to which a crystal vibrator 72 is connected, and an ESD protection element ESD1 comprised of an NMOS transistor N04 and an ESD protection element ESD2 comprised of an NMOS transistor N05, both of which are provided at the terminals X1N and XOUT.

Here, the feature of the oscillation circuit 702 of the present embodiment resides in that the terminal which has heretofore been connected to the power supply terminal VSS is connected to the output terminal of the constant voltage circuit 701. That is, the substrate for the NMOS transistor N02 configuring the feedback resistor RF and the gate of the PMOS transistor P02, the substrate for the NMOS transistor N03 configuring the switch element SW, and the substrate and gate of the NMOS transistor NR1 configuring the damping resistor RD are connected to the output terminal of the constant voltage circuit 701. Further, in the NMOS transistors N04 and N05 which respectively configure the ESD protection elements ESD1 and ESD2, their gates and sources and the substrate are respectively connected to the terminals XIN and XOUT, and their drains are connected to a power supply terminal VDD.

By connecting in this way, when the power supply voltage VSS is varied to the ground voltage VDD side, the fluctuation in the power supply voltage VSS is not transferred to the internal nodes (XIN, XIN1, XOUT, and XOUT1) of the oscillation circuit as noise.

Since the constant voltage VREG is not varied even if the power supply voltage VSS is varied to the ground voltage VDD side, although there exists a parasitic capacitance between a PWELL at the potential of the constant voltage VREG and an N+ diffusion region of the drain (or source) of each NMOS transistor, the fluctuation in the power supply voltage VSS is not transferred to the internal nodes of the oscillation circuit as the noise.

In the present embodiment, the drains of the ESD protection elements ESD1 and ESD2 may respectively be connected to the XIN and XOUT, and the gates and sources thereof and the substrate may respectively be connected to the output terminal of the constant voltage circuit 701. Further, the ESD protection elements ESD1 and ESD2 may respectively be configured using a diode connected to the output terminal of the constant voltage circuit 701 or the power supply terminal VDD.

As described above, according to the constant voltage circuit 701 and the oscillation circuit 702 in the present embodiment, even if the power supply voltage VSS is varied to the ground voltage VDD side, the constant voltage VREG is not varied and the stable oscillation can be continued. It is therefore possible to provide an analog electronic timepiece which is operable with being at least stable in current consumption.

Figure 3:
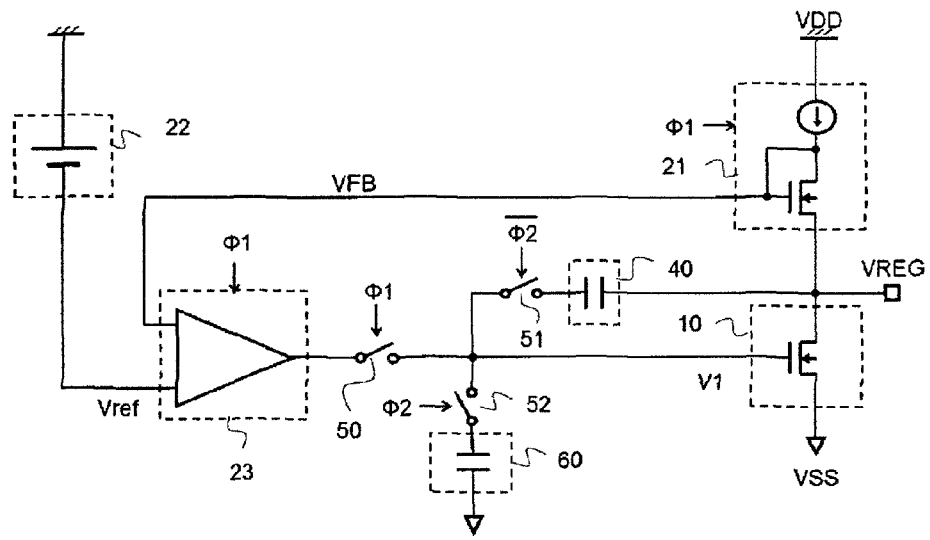
FIG. 3 is a block diagram illustrating another example of the constant voltage circuit of the present embodiment.

FIG. 3 is a block diagram illustrating another example of the constant voltage circuit 701 of the present embodiment. The circuit illustrated in FIG. 2 is further provided with a low current-consumption function.

The constant voltage circuit 701 is equipped with an output transistor 10, a feedback circuit 21, a reference voltage circuit 22, a differential amplifier circuit 23, switch circuits 50 to 52, and voltage holding circuits 40 and 60.

The differential amplifier circuit 23 and the feedback circuit 21 are on/off-controlled by a signal Φ1. The switch circuit 50 is on/off-controlled by the signal Φ1 in sync with the differential amplifier circuit 23. The voltage holding circuit 40 is comprised of, for example, a capacitor. The voltage holding circuit 40 is connected between a gate of the output transistor 10 and an output terminal and holds a gate voltage V1 of the output transistor 10. The voltage holding circuit 60 is comprised of, for example, a capacitor and connected between the gate of the output transistor 10 and a power supply terminal VSS. The switch circuits 51 and 52 are on/off-controlled by a signal 432. When the switch circuit 50 is turned off, the switch circuits 51 and 52 are turned on to hold the gate voltage V1 of the output transistor 10.

When, for example, the signals Φ1 and Φ2 are both at a High level, the differential amplifier circuit 23 and the feedback circuit 21 are operated to turn on the switch circuits 50 and 52 and turn off the switch circuit 51, thereby operating the constant voltage circuit 701 as a normal voltage regulator. Further, when the signals Φ1 and Φ2 are both at a Low level, the differential amplifier circuit 23 and the feedback circuit 21 are stopped from operating to turn off the switch circuits 50 and 52 and turn on the switch circuit 51, whereby the constant voltage circuit 701 is stopped from operating as the voltage regulator and brought into a low current consumption state. At this time, the voltage holding circuit 40 is connected between the gate of the output transistor 10 and the output terminal and holds the gate voltage V1.

Thus, the differential amplifier circuit 23 and the feedback circuit 21 are operated intermittently by the signal Φ1 to thereby enable the constant voltage circuit 701 of FIG. 3 to realize a reduction in current consumption and stably output a constant voltage VREG.

Now, if the signals Φ1 and Φ2 are controlled in such a manner that the constant voltage circuit 701 is operated as the normal voltage regulator, the analog electronic timepiece is capable of operating stably and providing low consumption when the motor 73 is driven.

Figure 4:
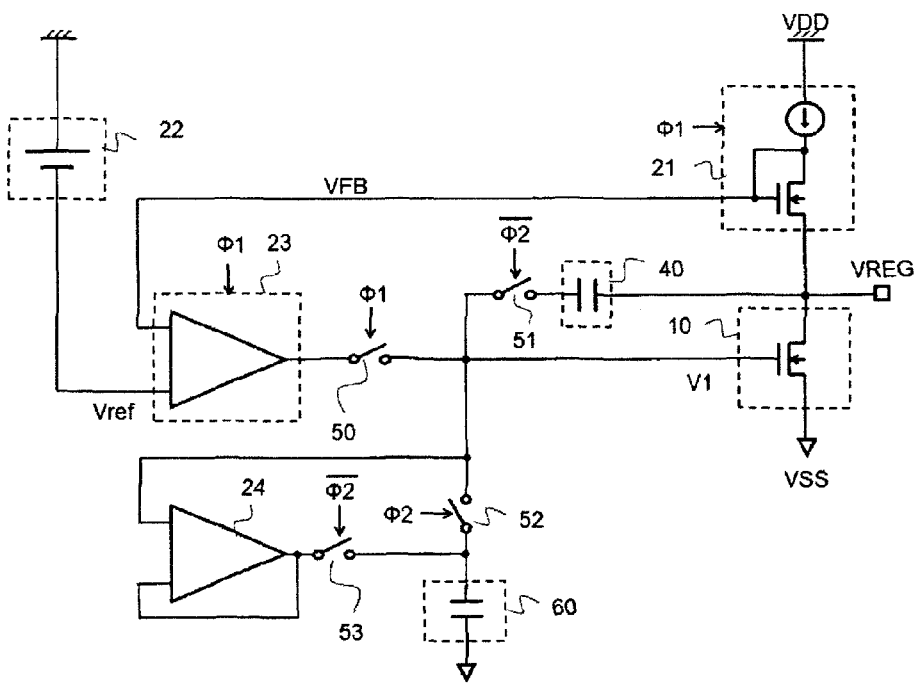
FIG. 4 is a block diagram illustrating a further example of the constant voltage circuit of the present embodiment.

FIG. 4 is a block diagram illustrating a further example of the constant voltage circuit 701 of the present embodiment. A circuit which is operated stabler is added to the circuit of FIG. 3.

The constant voltage circuit 701 is equipped with a precharge circuit for precharging the capacitor of the voltage holding circuit 60. The precharge circuit is equipped with an amplifier 24 and a switch circuit 53. The amplifier 24 has input terminals respectively connected to the gate of the output transistor 10 and an output terminal of the amplifier 24 and configures a voltage follower. That is, the amplifier 24 inputs the gate voltage V1 of the output transistor 10 therein and outputs the same to the capacitor of the voltage holding circuit 60. The switch circuit 53 is connected between the output terminal of the amplifier 24 and the voltage holding circuit 60. The switch circuit 53 is turned on when, for example, the signal Φ2 is at the Low level, and is turned off when at the High level.

When the constant voltage circuit 701 of FIG. 4 is operated as the normal voltage regulator, it turns on the switch circuit 53 to precharge the voltage of the voltage holding circuit 60 to the voltage V1. Thus, since the gate voltage V1 of the output transistor 10 is not varied when the signal Φ2 becomes the High level, the constant voltage circuit 701 is capable of stably outputting a constant voltage VREG.

As described above, the analog electronic timepiece of the present invention is capable of low consumption and stable operation with respect to a fluctuation in power supply voltage by providing the oscillation circuit 702 illustrated in FIG. 2 and the constant voltage circuit 701 illustrated in any of FIGS. 1, 3 and 4.

Incidentally, the amplifier 24 may be configured to be intermittently operated by a new signal Φ3 for the purpose of a reduction in current consumption.

Further, in the constant voltage circuit 701, the precharge circuit may be provided in the voltage holding circuit 40.

Incidentally, if the power supply voltage VSS is taken as the reference, though the analog electronic timepiece has been described with the ground voltage VDD as the reference, similar effects can be obtained if the circuits are configured according to the reference taken for the power supply voltage VSS.

What is claimed is:

1. An analog electronic timepiece, comprising:
    a crystal vibrator;
    an oscillation circuit;
    a frequency division circuit;
    a constant voltage circuit;
    an output control circuit; and
    a motor,
    said oscillation circuit and said frequency division circuit being operated with a constant voltage generated by the constant voltage circuit as a power supply, and
    said constant voltage circuit including:
        an output transistor connected between an output terminal and a power supply terminal,
        a voltage division circuit which is connected between the output terminal and a ground terminal and divides an output voltage of the output terminal to output a feedback voltage,
        a reference voltage circuit which outputs a reference voltage,
        a differential amplifier circuit which controls a voltage of a gate of the output transistor, based on the reference voltage and the feedback voltage, and
        a first voltage holding circuit connected between the gate of the output transistor and the power supply terminal.

2. The analog electronic timepiece according to claim 1, wherein the constant voltage circuit includes:
    a first switch circuit connected between an output terminal of the differential amplifier circuit and the gate of the output transistor,
    a second switch circuit connected between the gate of the output transistor and the first voltage holding circuit, and
    a second voltage holding circuit connected through a third switch circuit between the gate of the output transistor and the output terminal, and
    wherein the constant voltage circuit includes:
    a first operation mode to turn off the differential amplifier circuit and the first switch circuit by a first control signal and turn off the second switch circuit and turn on the third switch circuit by a second control signal, and
    a second operation mode to turn on the differential amplifier circuit and the first switch circuit by the first control signal and turn on the second switch circuit and turn off the third switch circuit by the second control signal.

3. The analog electronic timepiece according to claim 2, wherein the first voltage holding circuit is equipped with a precharge circuit, and
    wherein when the second switch circuit is off, the precharge circuit charges the first voltage holding circuit to the voltage of the gate of the output transistor.

4. The analog electronic timepiece according to claim 3, wherein the precharge circuit is equipped with a voltage follower circuit having an input terminal connected to the gate of the output transistor, and a fourth switch circuit connected between an output terminal of the voltage follower circuit and the first voltage holding circuit.

* * * * *